(12) United States Patent
Madasu et al.

(10) Patent No.: US 11,396,800 B2
(45) Date of Patent: Jul. 26, 2022

(54) TIME-DEPENDENT SPATIAL DISTRIBUTION OF MULTIPLE PROPPANT TYPES OR SIZES IN A FRACTURE NETWORK

(71) Applicant: Halliburton Energy Services, Inc., Houston, TX (US)

(72) Inventors: Srinath Madasu, Houston, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 310 days.

(21) Appl. No.: 16/096,614

(22) PCT Filed: Jul. 29, 2016

(86) PCT No.: PCT/US2016/044886
§ 371 (c)(1),
(2) Date: Oct. 25, 2018

(87) PCT Pub. No.: WO2018/022114
PCT Pub. Date: Feb. 1, 2018

(65) Prior Publication Data
US 2019/0136680 A1    May 9, 2019

(51) Int. Cl.
*E21B 43/267*    (2006.01)
*E21B 41/00*    (2006.01)
(Continued)

(52) U.S. Cl.
CPC .............. *E21B 43/267* (2013.01); *C09K 8/62* (2013.01); *E21B 41/00* (2013.01); *E21B 43/12* (2013.01)

(58) Field of Classification Search
CPC .......... E21B 43/267; E21B 43/12; C09K 8/62
See application file for complete search history.

(56) References Cited

U.S. PATENT DOCUMENTS 7,210,528 B1    5/2007    Brannon et al.
9,026,416 B2    5/2015    Mallison et al.
(Continued)

FOREIGN PATENT DOCUMENTS

| WO | 2013016733 A1 | 1/2013 |
| WO | 2014193529 A2 | 12/2014 |
| WO | 2018022114 A1 | 2/2018 |

OTHER PUBLICATIONS

Dershowitz, W. S., & Fidelibus, C. (1999). Derivation of equivalent pipe network analogues for three-dimensional discrete fracture networks by the boundary element method. Water Resources Research, 35(9), 2685-2691. (Year: 1999).*

(Continued)

*Primary Examiner* — Bijan Mapar
(74) *Attorney, Agent, or Firm* — John W. Wustenberg; Parker Justiss, P.C.

(57) ABSTRACT

A hydraulic fracturing flow simulation method includes identifying one or more reservoir layers contacted by a wellbore, the reservoir layers including a network of fractures. The method further includes determining a current network state that includes flow parameter values at discrete points arranged one-dimensionally along the wellbore and at discrete points arranged one-dimensionally along each fracture, the flow parameter values including concentrations of multiple proppant types or sizes. The method further includes constructing a set of linear equations for deriving a subsequent network state from the current network state while accounting for interaction and settling of the multiple proppant types or sizes. The method further includes repeatedly solving the set of linear equations to obtain a sequence of subsequent network states. The method further includes displaying the time-dependent spatial distribution.

19 Claims, 6 Drawing Sheets

(51) Int. Cl.
  *C09K 8/62* (2006.01)
  *E21B 43/12* (2006.01)

(56) References Cited

U.S. PATENT DOCUMENTS

| | | | |
|---|---|---|---|
| 9,367,653 B2* | 6/2016 | Madasu | G06F 30/23 |
| 2011/0320177 A1* | 12/2011 | Bowen | E21B 43/26 |
| | | | 703/2 |
| 2012/0158380 A1 | 6/2012 | Hajibeygi et al. | |
| 2014/0216736 A1* | 8/2014 | Leugemors | E21B 43/26 |
| | | | 166/266 |
| 2016/0010443 A1* | 1/2016 | Xu | E21B 47/07 |
| | | | 166/250.1 |
| 2016/0108705 A1* | 4/2016 | Maxwell | E21B 43/267 |
| | | | 166/250.1 |

OTHER PUBLICATIONS

Dysart, G.R., et al., "Fluid Temperature in Fractures," 42nd Annual Fall Meeting of the Society of Petroleum Engineers of Aime, SPE 1902, Oct. 1-4, 1967, 6 pages.

Norris, M.R., et al., "Multiple Proppant Fracturing of Horizontal Wellbores in a Chalk Formation: Evolving the Process in the Valhall Field," Mar. 2001, SPE Drilling & Completion, SPE 70133, Society of Petroleum Engineers Inc., pp. 48-59.

Yoshida, N., et al., "Temperature Prediction Model for a Horizontal Well With Multiple Fractures in a Shale Reservoir," SPE 166241, SPE Annual Technical Conference and Exhibition, New Orleans, Louisiana, Sep. 30-Oct. 2, 2013, 18 pages.

Schmidt, D., et al., "Performance of Mixed Proppant Sizes," SPE 168629, SPE Hydraulic Fracturing Technology Conference, The Woodlands, Texas, Feb. 4-6, 2014, 10 pages.

* cited by examiner

TIME-DEPENDENT SPATIAL DISTRIBUTION OF MULTIPLE PROPPANT TYPES OR SIZES IN A FRACTURE NETWORK

CROSS-REFERENCE TO RELATED APPLICATION

This application is the National Stage of, and therefore claims the benefit of, International Application No. PCT/US2016/044886 filed on Jul. 29, 2016, entitled "TIME-DEPENDENT SPATIAL DISTRIBUTION OF MULTIPLE PROPPANT TYPES OR SIZES IN A FRACTURE NETWORK," which was published in English under International Publication Number WO 2018/022114 on Feb. 1, 2018. The above application is commonly assigned with this National Stage application and is incorporated herein by reference in its entirety.

BACKGROUND

In the oil and gas industry, unconventional reservoirs often have a low-permeability rock matrix that impedes fluid flow, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure high-volume flow of a relatively incompressible fluid, the low permeability causes sharp gradients in the formation's stress field, forcing integrity failures at the relatively weakest points of the rock matrix. Such failures often occur as a sudden "cracking" or fracturing of the matrix that momentarily reduces the stress gradient until it can be rebuilt by the intruding fluid flow. As the high-pressure flow continues, the fractures may propagate, for example, as an intermittent series of small cracks or branches. The injected fluid also deforms and shifts blocks of matrix material, complicating the fracture propagation analysis. Adding yet another complication, small grains of sand or other proppants may be added to the flow with the goal of keeping the fractures open after the fluid pressure is removed.

Accordingly, accurate simulation of the hydraulic fracturing operation requires that proppant phenomena be taken into account. However, the computational resources available for simulation are typically limited, making it a challenge to implement the simulation process with sufficient efficiency and accuracy to guide field operations.

BRIEF DESCRIPTION OF THE DRAWINGS

Accordingly, the present disclosure provides simulation systems and methods that determine a time-dependent spatial distribution of multiple proppant types or sizes in a fracture network. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by simulation systems and methods that determine a time-dependent spatial distribution of multiple proppant types or sizes in a fracture network. Specifically, these systems and methods track the multiple types and sizes of proppant in an integrated wellbore fracture system by capturing, describing, and predicting the effect of fracture width, height, settling velocity, fluid temperature and fluid velocity on proppant distribution inside the integrated system along with the interactions between the proppants themselves. At least some embodiments employ a one-dimensional engineering model and computational methodology for simulating fluid and proppant flow to predict fluid and proppant distribution inside the fracture network, the proppant bed height resulting from proppant settling, internal interaction of the fluid and proppants, temperature distribution, pressure distribution, and the like. With this model providing a better understanding of proppant distribution, and thus fracture conductivity, the proppant schedule and/or fluid schedule may be optimized in real time and/or automatically, i.e. without human input.

Figure 1:
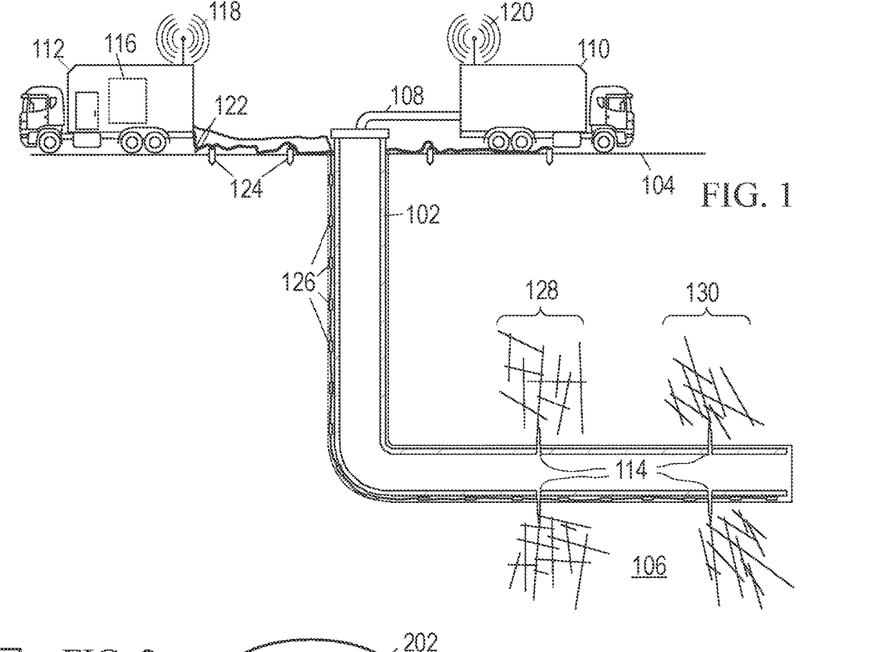
FIG. 1 is a contextual view of an illustrative fracturing environment.

The disclosed systems and methods are best understood in terms of the context in which they are employed. Accordingly, FIG. 1 shows the environment of an illustrative hydraulic fracturing operation. A wellbore 102 extends from the surface 104 into a subterranean region 106. Typically, the subterranean region 106 includes a reservoir that contains hydrocarbons or other resources such as, e.g., shale, coal, sandstone, granite, or other rocks with pores containing oil or natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not required. In some implementations, all or a portion of the wellbore 102 may be left open, i.e., without casing. The conduit 108 may include an injection manifold and feed pipe, as well as piping internal to the wellbore such as a work string, coiled tubing, sectioned pipe, or other type of conduit.

The fracture treatment may employ a single injection of fluid to one or more fluid injection locations 114, or it may employ multiple such injections, optionally with different fluids. Where multiple fluid injection locations 114 are employed, they can be stimulated concurrently or in stages. Moreover, they need not be located within the same wellbore 102, but may for example be distributed across multiple wells or multiple laterals within a well. A treatment control system 116 coordinates operation of the injection assembly components (pump trucks, feed tanks, throttles, valves, flow sensors, pressure sensors, etc.) to monitor and control the fracture treatment. Though shown as being localized to a single instrument truck 112, the treatment control system 116 may in practice take the form of multiple data acquisition and processing systems optionally distributed throughout the injection assembly and wellbore 102, as well as remotely-coupled offsite computing facilities available via communication links and networks. Though the computing system is described below in FIG. 2 as a separate entity for implementing hydraulic fracture simulation, some contemplated embodiments of the treatment control system 116 have the simulator as an integrated component.

The treatment control system 116 may periodically or continuously obtain measurement data as a function of position and/or time. Among other things, the treatment control system 116 processes data and generates a representative display for a user to perceive. Software may run on the treatment control system 116 to collect the data and organize it in a file or database stored on non-transient information storage media. Specifically, a processor coupled to memory may execute the software. The software may respond to user input via a keyboard or other input mechanism to display data as an image or movie on a monitor or other output mechanism. The software may process the data to optimize fracturing operations as described below. In at least one embodiment, the treatment control system 116, or a portion of the treatment control system 116, is located downhole within a housing able to protect the treatment control system 116 from the harsh downhole environment. In another embodiment, processors both at the surface and downhole may work together or independently to obtain, store, and process data. The treatment control system 116 may include computing hardware such as handheld mobile devices, tablets, notebooks, laptops, desktop computers, workstations, mainframes, distributed computing networks, and virtual (cloud) computing systems.

The treatment control system 116 may include data processing equipment, communication equipment, and other equipment for monitoring and controlling injection treatments applied to the subterranean region 106 through the wellbore 102. Additionally, the treatment control system 116 may be communicably linked to a remote computing facility that can calculate, select, or optimize treatment parameters for initiating, opening, extending, and conveying proppant into fractures. The treatment control system 116 may also receive, generate, or modify a fracture treatment plan (e.g., a pumping schedule) that specifies properties of a fracture treatment to be applied to the subterranean region 106. Based on simulated behavior, the treatment control system 116 shown in FIG. 1 controls operation of the injection assembly to optimize fluid compositions, flow rates, total flow volumes, injection pressure, and shut-in intervals.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, cross linked gels, linear gels, surfactants, breakers, stop-loss materials) for the fracture treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the treatment.

The instrument trucks 112 can include mobile vehicles, immobile installations, or other suitable structures and sensors for measuring temperatures, pressures, flow rates, and other treatment, production, and flow parameters. The example instrument trucks 112 shown in FIG. 1 include a treatment control system 116 that controls or monitors the fracture treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the treatment control system 116 to determine the microseismic event locations, times, and magnitudes. Such information is indicative of the fracture locations and dimensions, which information may be used to determine when the fracturing operations should be terminated and how to carry out subsequent operations to achieve the desired results.

Specifically, FIG. 1 shows that a treatment has fractured the subterranean region 106, producing first and second fracture families 128, 130 from respective perforations 114. The induced fractures may extend through naturally fractured rock, regions of un-fractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. The formation and propagation of fractures produces microseismic events, which may be identified and located based on analysis of the signals from sensors 124 and 126. The progression of the fracturing operation can thus be monitored and such monitoring used to derive information useful for simulating the fracture networks that have been formed and which may be formed in future fracturing operations in the region.

In some implementations, the treatment control system 116 collects and analyzes the signals from sensors 124, 126 to map fractures, monitor the spatial distribution of injected fluids, and to control the fluid injection parameters to optimize the modification of effective formation permeability. For example, the treatment control system 116 can modify, update, or generate a fracture treatment plan (pumping rates, pressures, volumes, fluid and proppant compositions, and timing) based on the estimated spatial distributions of various fluid components determined by simulation as described with respect to FIG. 2.

Figure 2:
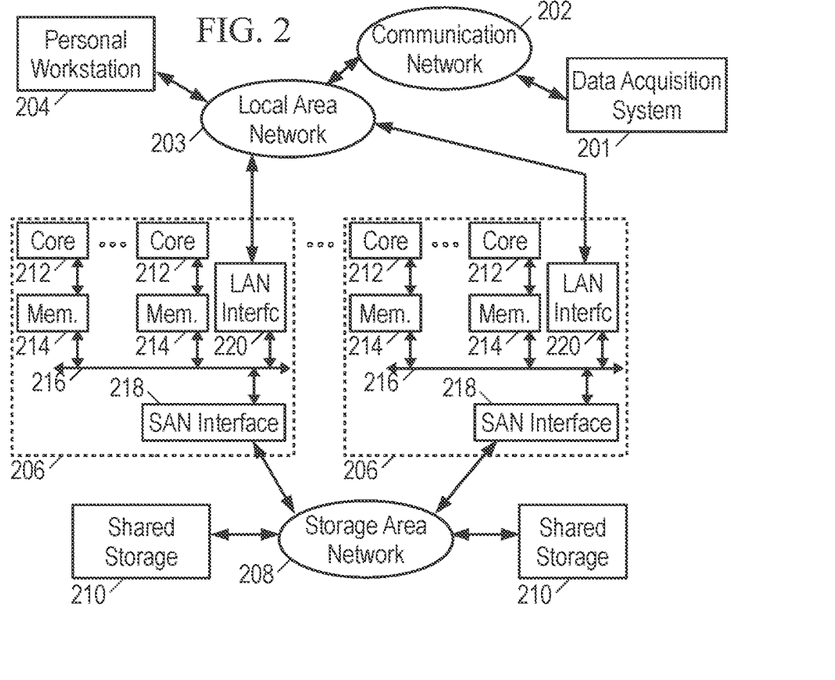
FIG. 2 is a block diagram of an illustrative system for fracturing simulation.

FIG. 2 shows an illustrative computing system 200 in which a data acquisition system 201 represents the instrument trucks 112 and other sources of data regarding the well and surrounding formations. The data acquisition system 201 may include a data acquisition module that identifies one or more reservoir layers contacted by a wellbore, the reservoir layers including a network of fractures. A communications network 202 (such as, e.g., the internet or other communications link for transferring digital data) couples the data acquisition system 201 to a local area network ("LAN") 203 to communicate the data to a personal workstation 204. The data can include treatment program data, geological data, fracture data, fluid data, proppant data, and the like. Workstation 204 may take the form of a desktop computer having a user interface (e.g., keyboard, pointer, and display) that enables the user to interact with the other elements of the computing system, e.g., by entering commands and viewing responses. In this fashion, the user or operator is able to retrieve the well data and make it available for simulation of a network of fractures, flow predictions, proppant distributions, and visualizations of flow within the fractures. For example, a visualization may be in an interactive form that enables the operator to enhance portions of the model and derive analytical results therefrom. The visual representation may depict spatial distributions of values and/or integrated values such as injected volumes, flow rates, fracture dimensions, proppant distributions, estimated permeabilities, and the like in the form of various charts, diagrams, tables, pictures, videos, and the like. In some contemplated embodiments, an analysis module further produces recommendations for real-time modifications to treatment plans that are underway. Alternatively, such analysis and modifications are implemented automatically, i.e., without human input.

Storage area network ("SAN") 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

The SAN 208 may store a measurement database including treatment program information such as a pumping schedule, flow rates, flow volumes, slurry concentrations, fluid compositions, injection locations, shut-in times, proppant characteristics, proppant properties, the relationship between proppants and fracture network characteristics, and the like. The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, natural fracture geometries, or other attributes of one or more rock formations in the subterranean zone. The geological data can include information collected from well logs, rock samples, outcroppings, microseismic imaging, tilt measurements, or other data sources.

The measurement database may still further include fluid data and proppant data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data and proppant data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, fracturing fluids including multiple types and/or sizes of proppants, or other fluids that may or may not be related to a well assembly.

Workstation 204 may lack sufficient internal resources to perform such processing in a timely fashion for complex fracture networks. As such, the LAN 203 may further couple the workstation 204 to one or more multi-processor computers 206, which are in turn coupled via a SAN 208 to one or more shared storage units 210. LAN 203 provides high-speed communication between multi-processor computers 206 and with personal workstation 204. The LAN 204 may take the form of an Ethernet network.

Multi-processor computer(s) 206 provide parallel processing capability to enable suitably prompt processing of the measurements and fracture simulation information to simulate fracture fluid flows. Each computer 206 includes multiple processors 212, distributed memory 214, an internal bus 216, a SAN interface 218, and a LAN interface 220, some or all of which may be incorporated into a processing module. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 204 or via a mailbox mechanism on storage devices 210.

The processors 212 may locate and simulate the flow of fluids and proppants along hydraulically induced fractures by fracture mapping, spatial discretization (separating the formation into zones), equation construction, and equation solving using information from the measurement database. Such simulations may include time-dependent spatial distribution of fluid flow parameters such as the concentration of multiple proppant types and/or sizes.

Figure 3:
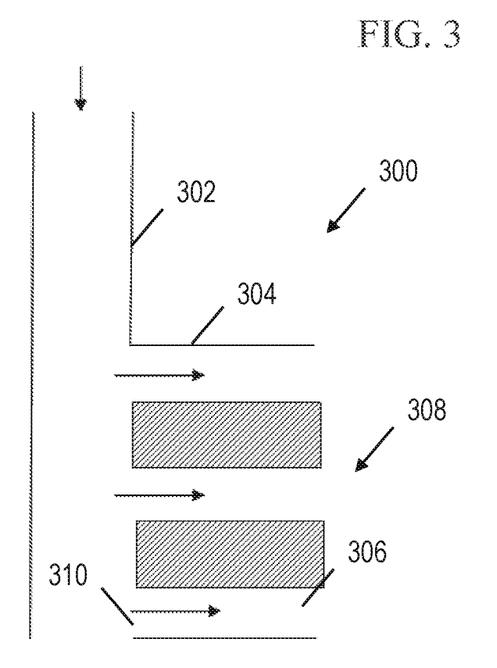
FIG. 3 is a diagram of an illustrative integrated wellbore fracture system.

For explanatory purposes, FIG. 3 illustrates a simplified example of an integrated wellbore fracture system 300 including a wellbore 302 in fluid communication with a reservoir 304 via multiple fractures 306 that form layers of a fracture network 308. Such a system may be simulated using the systems and methods disclosed herein. For ease of understanding, the wellbore 302 is shown as vertical while the layers are shown as horizontal; however, the teachings herein may be applied to wellbores, fractures, and layers in any orientation. Though the fractures 306 represent three dimensional objects having a length, a height, and an aperture, the flow parameters are simulated as uniform across the height and aperture, enabling each fracture 306 to be treated as a one-dimensional element. The wellbore 302 can be similarly simulated as one dimensional. The fractures 306 may be divided into discrete points at which the flow parameters (flow rate, pressure, proppant concentration, density, viscosity, and the like) are calculated.

The openings where the fractures 306 connect to the wellbore 302 are flow junctions 310. The wellbore 302 and fractures 306 may have different equations governing their simulations, and such equations may be related through connection equations that govern the simulation of the flow junctions 310.

Assuming one-dimensional fluid flow in the directions of the arrows, and that no cross-flow occurs between different layers, the reservoir 304 may be modeled as a general non-uniform distributed multilayered formation connected to the wellbore 302 at the flow junctions 310 using the following equations. In the wellbore 302, the dimensionless fluid mass and momentum conservation equations are given:

$$\frac{\partial A\rho}{\partial t} + \frac{\partial A\rho u}{\partial z} = \sum_{i=1}^{n} -\rho_{pi}\phi_i v_{si}\sqrt{R_w^2 - (R_w - h)^2} - \rho_f \phi_i v_{si}\sqrt{R_w^2 - (R_w - h)^2} (\phi_{critical})/(1 - \phi_{critical}) \quad (1)$$

$$\frac{\partial \rho Au}{\partial t} + \frac{\partial \rho Au^2}{\partial z} + A\frac{\partial p}{\partial z} + A\frac{f_f}{\pi}u^2 = \frac{1}{Re}\frac{\partial^2 Au}{\partial z^2} - \rho\frac{1}{Fr^2}\sin\theta - uA\left(\rho_{pi}\phi_i v_{si}\sqrt{R_w^2 - (R_w - h)^2} + \rho_f \phi_i v_{si}\sqrt{R_w^2 - (R_w - h)^2} (\phi_{critical})/(1 - \phi_{critical})\right) \quad (2)$$

$$\frac{\partial A\phi_i}{\partial t} + \frac{\partial A\phi_i u}{\partial z} = -\phi_i v_s \sqrt{R_w^2 - (R_w - h)^2} \quad i = 1, N \quad (3)$$

where the wellbore diameter and radius are D and $R_w$ respectively; the cross-sectional area of fracture is A; fluid velocity is u; mixture pressure is p; the proppant density is $\rho_p$; the settled proppant bed height is h; the critical volume fraction is $\phi_{critical}$; the proppant volume fraction is $\phi$; the fluid density is $\rho_f$; the mixture density is $\rho$; the viscosity $\mu$; $\theta$ the wellbore orientation; and fluid is injected into the wellbore 302 at a velocity of $u_{inlet}$.

The friction force, $f_f$, is given by:

$$f_f = \begin{cases} \frac{64}{Re} & Re \le 2300 \\ 0.079 Re^{-0.25} & Re > 2300 \end{cases} \quad (4)$$

The Reynolds number, Re, the Froude number, Fr, and the effective flow area A, are expressible as:

$$Re = \frac{\rho u_{inlet} D}{\mu}, Fr = \frac{u_{inlet}}{\sqrt{gD}} \quad (5)$$

$$A = \pi R_w^2 + (R_w - h)\sqrt{R_w^2 - (R_w - h)^2} - R_w^2 \cos^{-1}\left(\frac{R_w - h}{R_w}\right) \quad (6)$$

where $u_{inlet}$ is the velocity of the fluid as it is injected into the wellbore 302, D is the wellbore diameter (equal to $2R_w$), $\mu$ is the fluid viscosity (in pa s), and g represents gravity (in m/s$^2$).

The settling velocity, $v_{si}$, for proppants is given by:

$$v^2 si = \frac{4}{3C_D}\frac{(\rho_{pi} - \rho_f)g d_i}{\rho_f} e^{-5.9\phi_i} \quad (7)$$

where $d_i$ is the representative diameter of the ith proppant, and e is Euler's number.

The dimensionless fluid mass and momentum conservations in the fracture 304 are given by:

$$\frac{\partial A\rho}{\partial t} + \frac{\partial A\rho u}{\partial x} = -\rho_{pi}\phi_i v_{si} w - \rho_f \phi_i v_{si} w(\phi_{critical})/(1 - \phi_{critical}) \quad (8)$$

$$u = -Da\frac{\partial p}{\partial x} \quad (9)$$

$$\frac{\partial A\phi}{\partial t} + \frac{\partial A\phi u}{\partial x} = -\phi v_S w \quad (10)$$

where the Darcy number, Da, is expressible as $$Da = \frac{K}{D^2} Re, \ A = wh \quad (11)$$

and where h is the total proppant bed height.

The bed height of the ith proppant is given by:

$$\frac{dh_i}{dt} = \phi_i v_{si} / \phi_{critical} \quad (12)$$

The width of the fracture is given by:

$$w = \frac{2(1 - v^2)(H - h)}{E}(P - P_{closure}) \quad (13)$$

where H is the fracture height, E is the Young's modulus, v is the Poisson's ratio, P is the fracture pressure, and $P_{closure}$ is the closure pressure.

The density of the fluid is given by:

$$\rho = \rho_w(1-\phi) + \sum_{i=1}^{n} \rho_{pi}\phi_i \quad (14)$$

where $\rho_w$ is the density of the carrier fluid (in this case water). To account for temperature dependents, $\rho_w$ may be expressed as $$\rho_w = 992.544 + 1.402x + 0.171x^2 - 0.056x^3 + 0.004x^4 - 0.0002x^5 + 0.000006x^6 - 1.118\times10^{-7}x^7 + 1.229\times10^{-9}x^8 - 7.569\times10^{-12}x^9 + 1.996\times10^{-14}x^{10} \quad (15)$$

where $x = -49.0 + 0.2T$; $\rho_w$ is the density of water; and T is the temperature in Kelvin.

The viscosity of the fluid is given by:

$$\mu = \mu_w\left(1 - \sum_{i=1}^{n} \frac{\phi_i}{\phi_{max}}\right)^{-2} \quad (16)$$

where $\mu_w$ represents the viscosity of the carrier fluid (e.g., water). To account for temperature dependence, the viscosity may be expressed as:

$$\mu_w = -0.0004 + \frac{0.002}{x^3} - \frac{0.012}{x^2} + \frac{0.014}{x} + 0.000007x - 5.029\times10^{-8}x^2 - 1.714\times10^{-11}x^3 \quad (17)$$

where $\mu_w$ is the density of water, and T is the temperature in Kelvin.

The temperature of the fluid in the fracture network may be modeled using a second order differential equation:

$$\frac{d^2T}{dx^2} - \frac{\rho c_p}{K}\left(\frac{Q}{wH}\right)\frac{dT}{dx} - \left(\beta\left(\frac{Q}{wH}\right)^2\frac{1}{kK} + (U_{to} + Q_L\rho c_p)\right)T + 2\frac{1}{kK}\left(\frac{Q}{wH}\right)^2 + (U_{to}H + Q_L\rho c_p)T_{wall} = 0 \quad (18)$$

Equation (18) is a second order ordinary differential equation with the solution:

$$T = \frac{e^{\frac{1}{2}\left(\frac{-A_1(x_1+x_2)+}{\sqrt{A_1^2+4A_2}(-2x+x_1+x_2)}\right)}}{A_2\left(-1+e^{\sqrt{A_1^2+4A_2}(x_1-x_2)}\right)}\left[\begin{array}{c} A_3 e^{\frac{1}{2}\left(\sqrt{A_1^2+4A_2}(2x-x_1-x_2)+A_1(x_1+x_2)\right)}\left(-1+e^{\sqrt{A_1^2+4A_2}(x_1-x_2)}\right) + \\ e^{\sqrt{A_1^2+4A_2}(x_1-x_2)}\left[\begin{array}{c} -e^{\frac{1}{2}\left(\sqrt{A_1^2+4A_2}(x-x_1)+A_1(x+x_2)\right)} \\ \left(-1+e^{\sqrt{A_1^2+4A_2}(x_1-x_2)}\right)(A_3-A_2T_1) + \\ e^{\frac{1}{2}\left(\sqrt{A_1^2+4A_2}(x-x_{21})+A_1(x+x_1)\right)} \\ \left(-1+e^{\sqrt{A_1^2+4A_2}(x-x_1)}\right)(A_3-A_2T_2) \end{array}\right] \end{array}\right] \quad (19)$$

$$A_1 = \frac{\rho c_p}{K}\left(\frac{Q}{wH}\right) \quad (20)$$

$$A_2 = \left(\beta\left(\frac{Q}{wH}\right)^2\frac{1}{kK} + (U_{to} + Q_L\rho c_p)\right)^{10} \quad (21)$$

$$A_3 = 2\frac{1}{kK}\left(\frac{Q}{wH}\right)^2 + (U_{to}H + Q_L\rho c_p)T_{wall} \quad (22)$$

where $T_{wall} = T_{reservoir}$ assuming equilibrium between the reservoir and the fracture face, and $T_{reservoir}$ is the earth temperature, which is assumed to increase linearly with depth.

The temperature of the formation surrounding the wellbore is given by:

$$\rho v\frac{d}{d\eta}\left[\frac{1}{2}(v)^2 + C_P(T) - C_P\mu_{JT}(p)\right] - \rho v g\sin\theta\frac{+2}{R_{well}}\frac{1}{R_{well}}\left[\frac{1}{r_{tot}U_{tot}} + \frac{f(t)}{k_{earth}}\right]^{-1}(T - T_{earth}) = 0 \quad (23)$$

The temperature for fluid in the wellbore is given by:

$$T_{well} = T_{earth} + Ag\sin\theta + ((T_{fbh} - T_{earth}) - Ag\sin\theta)\exp\frac{(L_{bh}-\eta)}{A} \quad (24)$$

Equations governing simulation of the flow junction 310 are used to connect the equations governing the simulation of the wellbore 302 and the equations governing the simulation of the reservoir 304. Such connection equations describe mass conservation, pressure continuity, and Darcy's law for the velocity $u_r$ of fluid entering the reservoir at the all flow junctions 310. At any junction point except the final flow junction 310, the connection equations are:

$$u_{w,in} - u_{w,out} = \frac{2h}{R_w} u_f \tag{25}$$

$$p_w = p_f \tag{26}$$

$$u_r = -Da \frac{\partial p}{\partial x} \tag{27}$$

$$\phi_w = \phi_f \tag{28}$$

$$T_w = T_f \tag{29}$$

Subscript w and f represent the wellbore and fracture, respectively. Note that for the fluid entering the reservoir, the proppant concentrations are preserved, i.e., $\phi_w = \phi_r$, and the temperature is preserved $T_w = T_r$. Equation (26) connects the pressure in the wellbore 302 and fracture 306 at the flow junctions 310 except at the final flow junction 310. Similarly, the wellbore 302 and fracture proppant volume fraction and temperature are connected using Equations (28-29). At the final flow junction 310, mass is conserved according to equation (30), and all of the remaining fluid leaves the wellbore such that the flow is matched but pressure is obtained from Darcy's law as given by equation (31):

$$u_w = \frac{2h}{R_w} u_f \tag{30}$$

$$\frac{\partial p}{\partial x} = -\frac{1}{Da} u_f \tag{31}$$

Boundary conditions and initial conditions for solving the equations may be given by:

$$u|_{z=0} = u_{inlet} \tag{32}$$

$$\phi|_{z=0} = \phi_{inlet} \tag{33}$$

$$T|_{z=0} = T_{inlet} \tag{34}$$

$$\frac{\partial (ru)}{\partial r}\bigg|_{r=r_e} = 0 \tag{35}$$

$$p|_{x=x_e} = p_e \tag{36}$$

$$u|_{x=L} = 0 \tag{37}$$

$$T|_{x=x_e} = T_e \tag{38}$$

where $u|_{t=0} = 0$, $T|_{t=0} = 0$ and $\phi|_{t=0} = 0$.

Figure 4:
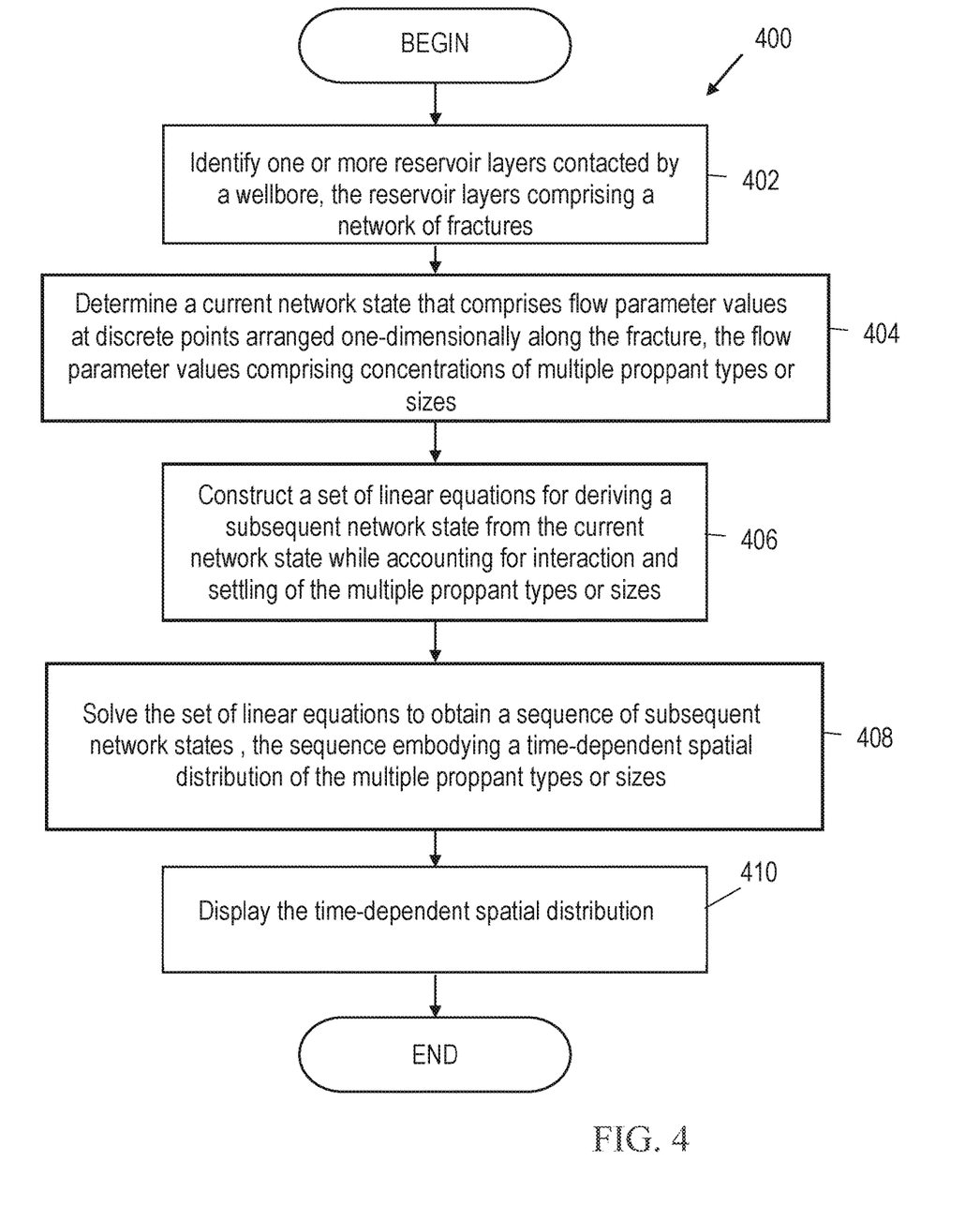
FIG. 4 is a flow diagram of an illustrative fracturing simulation method.

In view of the foregoing simulation equations, FIG. 4 is a flow diagram of an illustrative hydraulic fracturing flow simulation method 400 that accounts for multiple proppant types and/or sizes and may be implemented in the previously described computing systems. For example, the flow simulation method may be implemented by simulation software having one or more software packages and libraries installed in the computer systems to provide the functionality for solving linear systems. User-authored programs, functions, scripts, workflows, or other programming mechanisms may be employed to customize the operation of the software and automate the operations outlined below for simulating flow with a one-dimensional formation model. The simulation software may include a formation modeling module, a flow path discretization module, an equation construction module, an equation solving module, a user interface module, and other function modules, each implemented in the form of machine-readable instructions. Examples of suitable programming language instructions include C, C++, C++ AMP, D, Erlang, Python and Fortran. The computing systems can be preprogrammed with the software or can be programmed (and reprogrammed) by loading a program from another source (e.g., from a CD-ROM, from another computer device through a data network, or in another manner). Nevertheless, the implementation of the foregoing methods is not limited to any specific software language or execution environment. Though the operations of the method are shown and described as being sequential, in practice the operations are expected to occur concurrently and in a potentially different order.

At 402 one or more processors, which may be included in the data acquisition modules described above, identify one or more reservoir layers, including a network of fractures, contacted by a wellbore. For example, the processors may obtain information regarding the properties of the region and fluids to be simulated including formation layering, permeability, injection rates, viscosities, and boundary conditions. The processors may discretize the borehole and layer flow paths employing the information from the measurement database to locate and simulate the flow of fluids along the fractures. The fracture and fluid properties may be stored in a model database, and may include time-dependent spatial distribution of fluid flow parameters as discussed below.

At 404, one or more processors, which may be included in the processing modules described above, determine a current network state, derived from the data acquired at 402, that includes flow parameter values at the discretized points or nodes arranged one-dimensionally along the wellbore and at the discretized points arranged one-dimensionally along each fracture. The flow parameter may include concentrations of multiple proppant types or sizes, velocity, pressure, density, viscosity, temperature, fracture width, fracture height, proppant settling velocity, proppant distribution, and proppant settling height. For example, the processors may construct a state vector representing the flow parameter values at each of the discretization points, which initially represent the formation state before the treatment operation begins.

At 406, the one or more processors construct a set of linear equations for deriving a subsequent network state from the current network state while accounting for interaction and settling of the multiple proppant types or sizes. For example, the processors may construct a sparse solution matrix representing equations (1)-(36) as applied to the wellbore, reservoir, and fractures. Boundary conditions are imposed by specifying selected node values, usually edge discretization points. For example, the injected flow rate and/or fluid pressure may be specified by setting suitable values at the topmost discretization point in the wellbore. Boundary formation pressures may be provided at the outermost discretization points. Together the state vector and solution matrix provide a set of linear equations that the processors solve at 408 to express the subsequent state vector in terms of the current state vector.

At 408, the one or more processors repeatedly solve the set of linear equations to obtain a sequence of subsequent network states responsive to injection of fluids and proppants via the wellbore pursuant to a proppant schedule. By repeatedly or iteratively applying the equations to each newly achieved state, the processors simulate flow through the wellbore, flow junctions, and fractures. For example, the processors may save the subsequent state vector as the "current" state vector for each iteration. Next, the processors may update a time index and terminate the iteration when the last time index, specified by the user, has been reached. The sequence of network states embodies a time-dependent spatial distribution of the multiple proppant types or sizes as described according to equation (3). For example, the variable $\phi i$ is a function of position along the wellbore and along the reservoir layer or fracture and represents the concentration of the ith proppant at that position at each given time instant. Different proppants may have different particle sizes, different materials, or different amounts of material. The variable hi is the bedding height, representing the volume of ith proppant that has settled at that position at each given time instant. The simulation determines these values as the equations are repeatedly solved to determine the next state. The distribution may include proppant bed height as function of distance from the wellbore in each layer, proppant concentration as function of distance from the wellbore in each layer, and the like.

At 410, the one or more processors display, or output for display, at least one time-dependent spatial distribution. For example, the processors may store the distribution on a non-transient information storage medium and display a visual representation of the distribution to a user. The display may include the predicted density distribution or predicted viscosity distribution of fluid throughout the network as determined through the subsequent network states. Similarly, the display may include the predicted proppant distribution, the predicted temperature distribution of fluid, or the predicted proppant settling height distribution throughout the network.

The display may be in an interactive form that enables the user to enhance portions of the display, e.g. display more details about a particular portion of the display, and derive analytical results therefrom. The display may depict spatial distributions of values and/or integrated values such as injected volumes, flow rates, fracture dimensions, and estimated permeabilities.

The method may include recording a relationship between a change in the proppant schedule, including multiple types and sizes of proppants, and a change in the time-dependent spatial distribution. Such a relationship may be stored for later use when adjusting the proppant schedule to predict future behavior of the fracture network. For example, the method may also include modifying the proppant schedule based on the distribution. Specifically, the subsequent network states may be used as a basis for predicting the results of an ongoing or future fracturing program and/or modifying the fracturing program, e.g., by adjusting the injection fluid compositions, flow rates, volumes, etc. as needed to achieve the desired fracturing results based on the recorded relationship.

Figure 5:
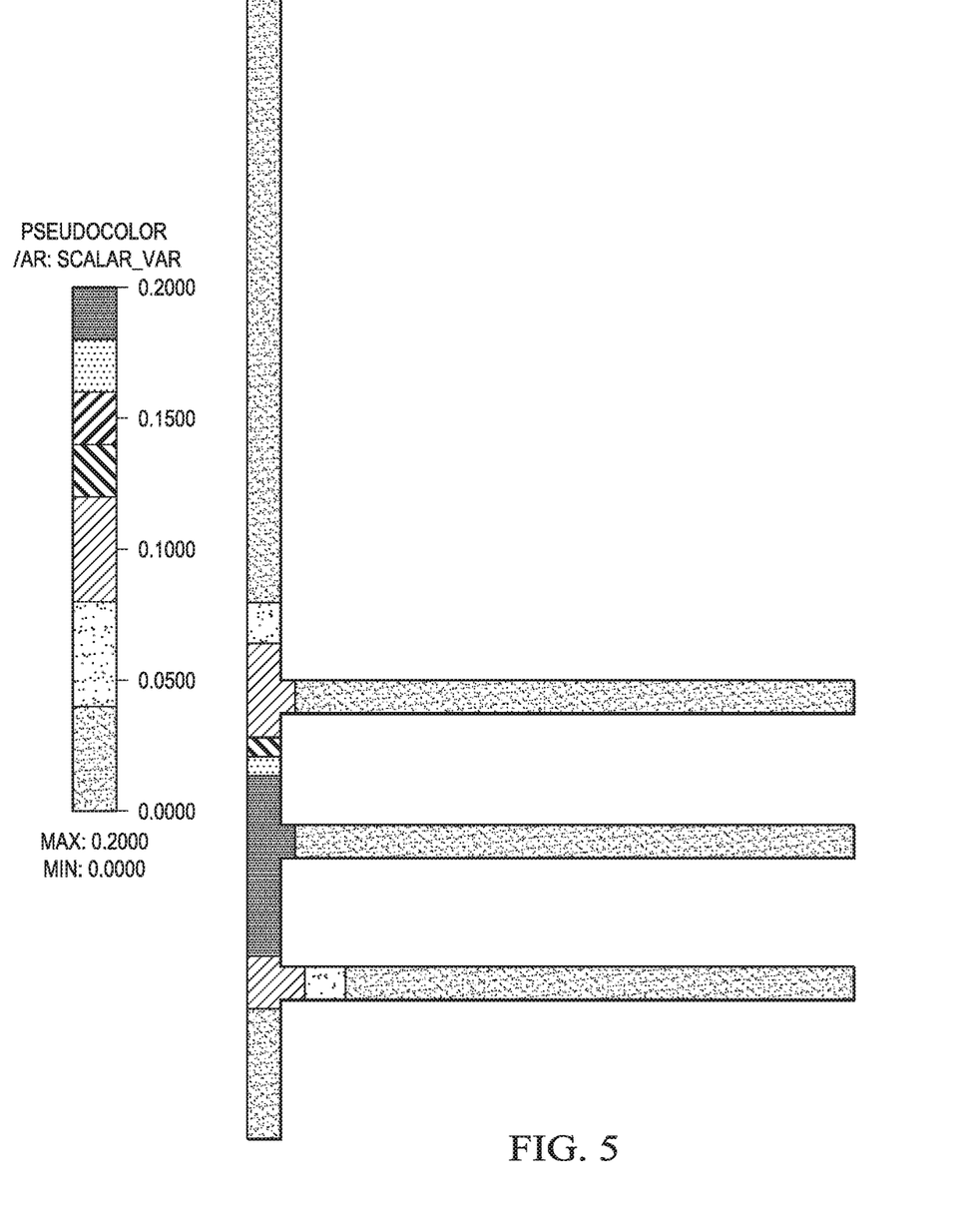
FIG. 5 is a diagram of a portion of an illustrative time-dependent spatial distribution of a first proppant distribution at a specific time.
Figure 6:
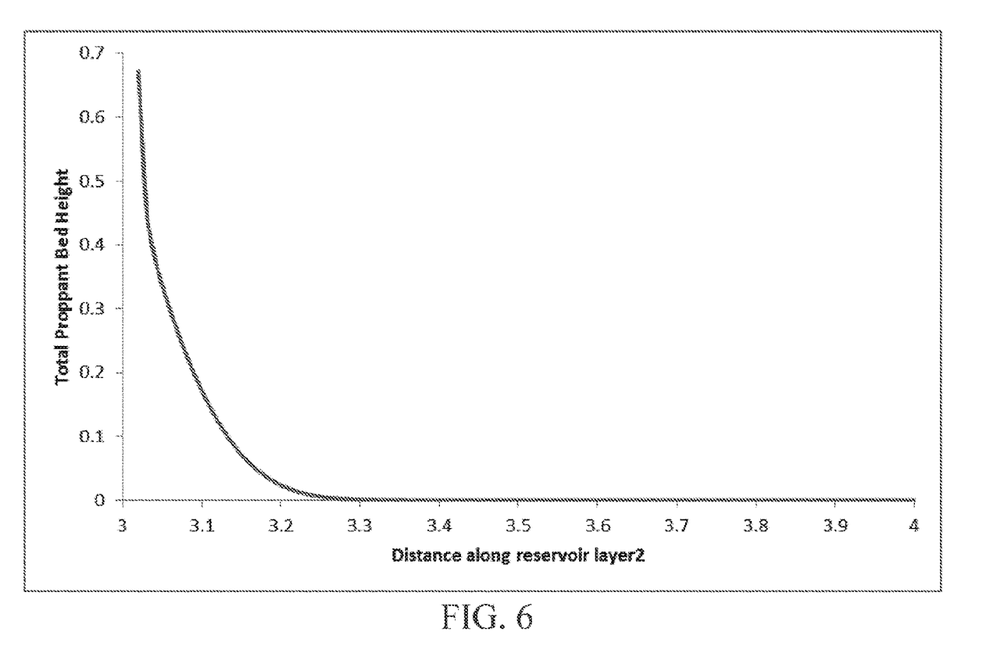
FIG. 6 is a chart of an illustrative proppant bed height for a fracture at a specific time.
Figure 7:
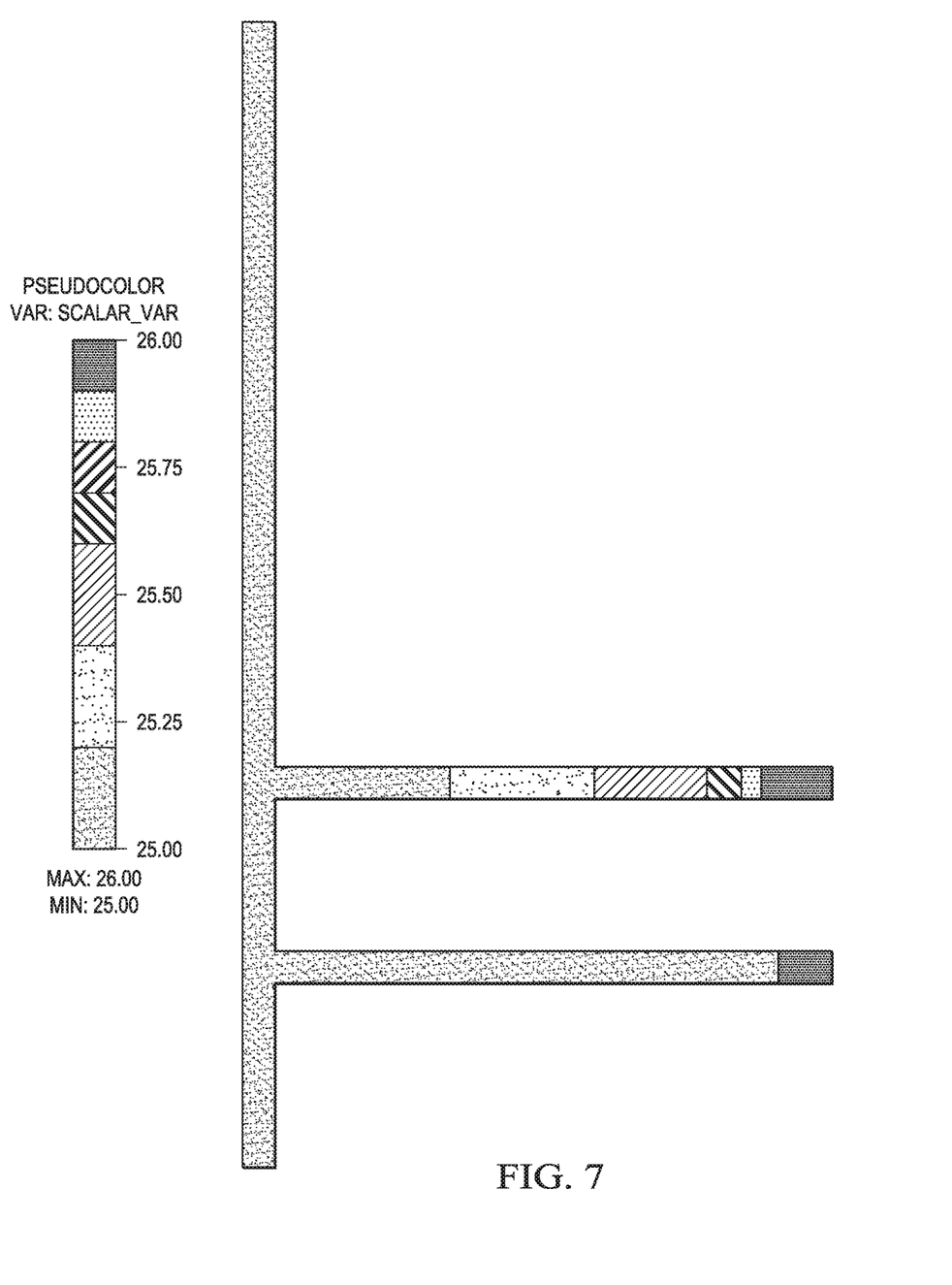
FIG. 7 is a diagram of a portion of an illustrative time-dependent spatial distribution of the temperature of the fracture network at a particular time.

Simulation results employing the foregoing techniques are shown in FIGS. 5-7. Specifically, the techniques were applied to a one dimensional formation model having an open hole drilling system consisting of a vertical wellbore and a horizontal reservoir. The wellbore was assumed to have a diameter, D, of 0.1 meters and a length of 1.0 in dimensionless units. The reservoir formation was assumed to have height of pay zone of 1.0 meter, an initial width, w, of 0.1 meters, fracture height of 10 meters, and length of 10 meters. The fluid was assumed to have been injected with a velocity $u_{inlet}$=0.1 m/s, and the time step was assumed to be 0.1 s.

FIG. 5 shows proppant distribution along the fractures at t=0.05 s with three layers. Specifically. most of the proppant is flowing in the second fracture rather than the first or third fracture.

FIG. 6 shows the total proppant bed height along the second fracture. Specifically, there is a large settling close to the inlet of the fracture, but the settling drops as the distance from the inlet increases. Accordingly, the proppant schedule may be adjusted to increase the velocity of fracturing fluid to carry the subsequent pumped proppant further along the layer because the increased bed height near the inlet reduces the effective area for flow.

FIG. 7 shows the temperature distribution of fluid within the wellbore and two layers (top and bottom). Based on this distribution, the fluid schedule may be adjusted to increase velocity in the top layer because the temperature gradient in the top layer is indicative of slow fluid and the absence of a temperature gradient in the wellbore and bottom layer is indicative of fast fluid. Such adjustment may cause the flow in the top layer to be uniform with the flow in the bottom layer.

In at least one embodiment, a hydraulic fracturing flow simulation method includes identifying one or more reservoir layers contacted by a wellbore, the reservoir layers including a network of fractures. The method further includes determining a current network state that includes flow parameter values at discrete points arranged one-dimensionally along the wellbore and at discrete points arranged one-dimensionally along each fracture, the flow parameter values including concentrations of multiple proppant types or sizes. The method further includes constructing a set of linear equations for deriving a subsequent network state from the current network state while accounting for interaction and settling of the multiple proppant types or sizes. The method further includes repeatedly solving the set of linear equations to obtain a sequence of subsequent network states responsive to injection of fluids and proppants via the wellbore pursuant to a proppant schedule, the sequence embodying a time-dependent spatial distribution of the multiple proppant types or sizes. The method further includes displaying the time-dependent spatial distribution.

In another embodiment, a hydraulic fracturing flow system includes a data acquisition module that identifies one or more reservoir layers contacted by a wellbore, the reservoir layers including a network of fractures. The system further includes a processing module that determines a current network state that includes flow parameter values at discrete points arranged one-dimensionally along the wellbore and at discrete points arranged one-dimensionally along each fracture, the flow parameter values including concentrations of multiple proppant types or sizes. The processing module constructs a set of linear equations for deriving a subsequent network state from the current network state while accounting for interaction and settling of the multiple proppant types or sizes. The processing module repeatedly solves the set of linear equations to obtain a sequence of subsequent network states responsive to injection of fluids and proppants via the wellbore pursuant to a proppant schedule, the sequence embodying a time-dependent spatial distribution of the multiple proppant types or sizes. The processing module displays the time-dependent spatial distribution.

The following features may be incorporated into the various embodiments described above, such features incorporated either individually in or conjunction with one or more of the other features. The time-dependent spatial distribution may include proppant bed height as function of distance from the wellbore in each layer. The time-dependent spatial distribution may include proppant concentration as function of distance from the wellbore in each layer. The method may include modifying the proppant schedule based on the time-dependent spatial distribution. The flow parameter may be selected from the group consisting of velocity, pressure, density, viscosity, temperature, fracture width, fracture height, proppant settling velocity, proppant distribution, and proppant settling height. The method may include recording a relationship between a change in the proppant schedule and a change in the time-dependent spatial distribution. Displaying the time-dependent spatial distribution may include displaying predicted density distribution or predicted viscosity distribution of fluid throughout the network. Displaying the time-dependent spatial distribution may include displaying predicted proppant distribution throughout the network. Displaying the time-dependent spatial distribution may include displaying predicted temperature distribution of fluid throughout the network. Displaying the time-dependent spatial distribution may include displaying predicted proppant settling height distribution throughout the network. The processing module may modify the proppant schedule based on the time-dependent spatial distribution. The flow parameter may be selected from the group consisting of velocity, pressure, density, viscosity, temperature, fracture width, fracture height, proppant settling velocity, proppant distribution, and proppant settling height. The processing module may record a relationship between a change in the proppant schedule and a change in the time-dependent spatial distribution. Displaying the time-dependent spatial distribution may cause the processing module to display predicted proppant distribution throughout the network. Displaying the time-dependent spatial distribution may cause the processing module to display predicted temperature distribution of fluid throughout the network. Displaying the time-dependent spatial distribution may cause the processing module to display predicted proppant settling height distribution throughout the network. Displaying the time-dependent spatial distribution may cause the processing module to display predicted density distribution or predicted viscosity distribution of fluid throughout the network.

While the present disclosure has been described with respect to a limited number of embodiments, those skilled in the art will appreciate numerous modifications and variations therefrom. It is intended that the appended claims cover all such modifications and variations.

What is claimed is:

1. A hydraulic fracturing flow simulation method comprising:
    identifying one or more reservoir layers contacted by a wellbore, the reservoir layers comprising a network of fractures;
    determining a current network state that comprises flow parameter values at discrete points along the wellbore and at discrete points along each fracture where each fracture is treated as a one-dimensional element with flow parameters simulated as uniform across a height and aperture of each fracture whose width changes with time as a function of fracturing fluid pressure and a local closure pressure so that a transmissibility of the fracturing fluid changes as the fracture width changes, the flow parameter values comprising concentrations of multiple proppant types or sizes;
    constructing a set of linear equations for deriving a subsequent network state from the current network state while accounting for interaction and settling of the multiple proppant types or sizes;
    repeatedly solving the set of linear equations to obtain a sequence of subsequent network states responsive to injection of fluids and proppants via the wellbore pursuant to a proppant schedule, the sequence embodying a time-dependent spatial distribution of the multiple proppant types or sizes;
    displaying the time-dependent spatial distribution; and
    controlling a fracture treatment in real-time based on the time-dependent spatial distribution of the multiple proppant types or sizes.

2. The method of claim 1, wherein the time-dependent spatial distribution comprises multiple proppant bed heights as function of distance from the wellbore in each layer.

3. The method of claim 1, wherein the time-dependent spatial distribution comprises multiple proppant concentrations as function of distance from the wellbore in each layer.

4. The method of claim 1, further comprising modifying the proppant schedule based on the time-dependent spatial distribution.

5. The method of claim 1, wherein the flow parameter is selected from the group consisting of velocity, pressure, density, viscosity, temperature, fracture width, fracture height, multiple proppant settling velocities, multiple proppant distributions, and multiple proppant settling heights.

6. The method of claim 1, further comprising recording a relationship between a change in the proppant schedule and a change in the time-dependent spatial distribution.

7. The method of claim 1, wherein displaying the time-dependent spatial distribution comprises displaying predicted density distribution or predicted viscosity distribution of fluid throughout the network.

8. The method of claim 1, wherein displaying the time-dependent spatial distribution comprises displaying predicted proppant distribution throughout the network for multiple proppant types or sizes.

9. The method of claim 1, wherein displaying the time-dependent spatial distribution comprises displaying predicted temperature distribution of fluid throughout the network.

10. The method of claim 1, wherein displaying the time-dependent spatial distribution comprises displaying predicted proppant settling height distribution throughout the network for multiple proppant types or sizes.

11. A hydraulic fracturing flow system comprising:
    a data acquisition system that identifies one or more reservoir layers contacted by a wellbore, the reservoir layers comprising a network of fractures; and
    at least one processor of at least one multi-processor computer that:
        determines a current network state that comprises flow parameter values at discrete points along the wellbore and at discrete points along each fracture where each fracture is treated as a one-dimensional element with flow parameters simulated as uniform across a height and aperture of each fracture, the flow parameter values comprising concentrations of multiple proppant types or sizes;
        constructs a set of linear equations for deriving a subsequent network state from the current network state while accounting for interaction and settling of the multiple proppant types or sizes;
        repeatedly solves the set of linear equations to obtain a sequence of subsequent network states responsive to injection of fluids and proppants via the wellbore pursuant to a proppant schedule, the sequence embodying a time-dependent spatial distribution of the multiple proppant types or sizes wherein the time-dependent spatial distribution comprises multiple proppant bed heights as a function of distance from the wellbore in each layer;

displays the time-dependent spatial distribution, and controlling a fracture treatment in real-time based on the time-dependent spatial distribution of the multiple proppant types or sizes.

12. The system of claim 11, wherein the time-dependent spatial distribution comprises multiple proppant concentrations as function of distance from the wellbore in each layer.

13. The system of claim 11, wherein the at least one processor of at least one multi-processor computer modifies the proppant schedule based on the time-dependent spatial distribution.

14. The system of claim 11, wherein the flow parameter is selected from the group consisting of velocity, pressure, density, viscosity, temperature, fracture width, fracture height, multiple proppant settling velocities, multiple proppant distributions, and multiple proppant settling heights.

15. The system of claim 11, wherein the at least one processor of at least one multi-processor computer records a relationship between a change in the proppant schedule and a change in the time-dependent spatial distribution.

16. The system of claim 11, wherein displaying the time-dependent spatial distribution causes the at least one processor of at least one multi-processor computer to display predicted proppant distribution throughout the network.

17. The system of claim 11, wherein displaying the time-dependent spatial distribution causes the at least one processor of at least one multi-processor computer to display predicted temperature distribution of fluid throughout the network.

18. The system of claim 11, wherein displaying the time-dependent spatial distribution causes the at least one processor of at least one multi-processor computer to display predicted proppant settling height distribution for multiple proppant types or sizes throughout the network.

19. The system of claim 11, wherein displaying the time-dependent spatial distribution causes the at least one processor of at least one multi-processor computer to display predicted density distribution or predicted viscosity distribution of fluid throughout the network.

* * * * *